United States Patent [19]

Heisner

[11] 4,278,372
[45] Jul. 14, 1981

[54] ADJUSTABLE BORING BAR MECHANISM

[75] Inventor: Marvin M. Heisner, Howeel, Mich.

[73] Assignee: Fansteel Inc., North Chicago, Ill.

[21] Appl. No.: 98,936

[22] Filed: Nov. 30, 1979

[51] Int. Cl.³ .......................................... B23B 29/034
[52] U.S. Cl. ..................... 408/183; 408/157; 408/179; 407/45
[58] Field of Search ............... 408/183, 184, 185, 182, 408/181, 179, 157, 153; 407/54

[56] References Cited

U.S. PATENT DOCUMENTS

| | | | |
|---|---|---|---|
| 1,251,140 | 12/1917 | Van Der Vorn | 408/182 |
| 1,389,492 | 8/1921 | Davie | 408/182 |
| 2,874,597 | 2/1959 | Bach | 408/179 |
| 3,724,965 | 4/1973 | Green | 408/153 |
| 3,853,422 | 12/1974 | Benjamin et al. | 408/179 |
| 4,162,867 | 7/1979 | Calcaterra et al. | 408/157 |

*Primary Examiner*—Leonidas Vlachos
*Attorney, Agent, or Firm*—Barnes Kisselle, Raisch & Choate

[57] ABSTRACT

An adjustable multiple blade boring bar with diametrically disposed overlapping blade blocks, each adjustable in and out and a control cartridge having actuator pins movable in opposite directions in response to rotation of a differential screw, the pins being oriented in relation to slots on the blade block to move in a camming relationship to shift the blocks in and out. A differential screw associates the control cartridge and the boring bar to permit radial equalization of the blade block when installed initially or after sharpening.

7 Claims, 8 Drawing Figures

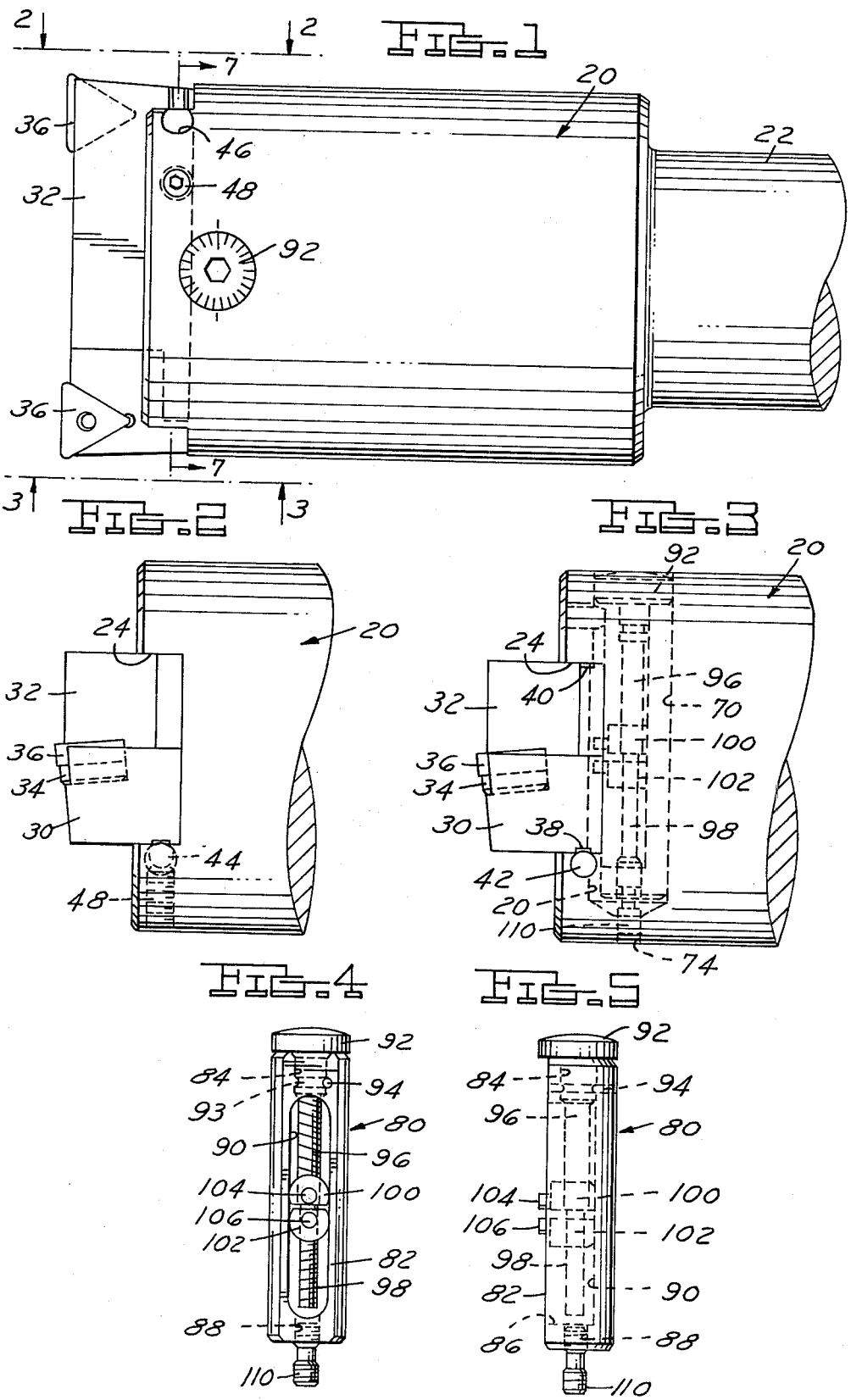

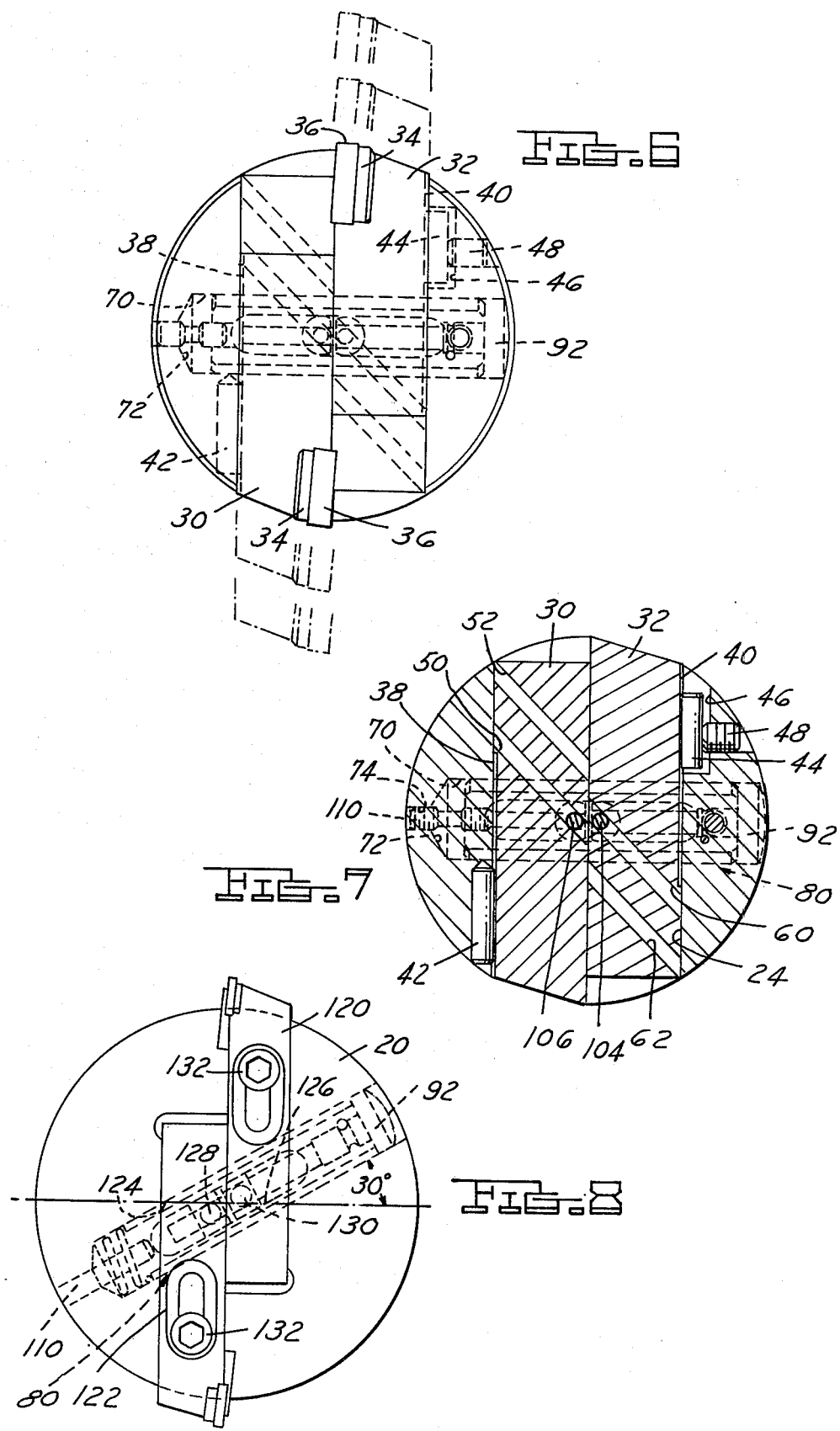

ADJUSTABLE BORING BAR MECHANISM

FIELD OF INVENTION:

The invention relates to the metal cutting field and particularly to the boring bar field where relative rotation between a workpiece and a boring bar provides an accurate bore in the workpiece with a fine wall finish.

BACKGROUND OF THE INVENTION:

Boring bars have been used for many years with a fixed cutter projecting radially from a cylindrical bar to finish the cylindrical walls of a bore in a workpiece. Boring bars are also available with one or two adjustable cutters with suitable cutting tips which project radially from a boring bar. Adjustment is desirable to obtain accurate diametrical dimension and also to compensate for tool wear. Where two opposed cutters are used, a balancing of the cutting forces reduces the bending moment on the bar, but it is also important tha each cutter have the same radial dimension to avoid chatter and to equalize the cutting load on the diametrically opposed cutting edges.

Usually the opposed cutters are adjustable simultaneously by a single manually movable part. A problem exists in obtaining the initial positioning of the radial cutters and also in maintaining the position should one cutting edge wear more rapidly than the other.

It is, therefore, an object to provide a boring bar which is relatively simple in design and which permits initial adjustment to equalize the radial positioning of the cutters and which also permits simultaneous adjustment with a fine adjustment which minimizes backlash.

Other objects and features of the invention will be apparent in the following description and claims in which the principles of the invention are set forth together with the manner and process of utilizing the invention directed to persons skilled in the art, all in connection with the best modes presently contemplated for the practice of the invention.

BRIEF DESCRIPTION OF THE DRAWINGS

Drawings accompany the disclosure and the various views thereof may be briefly described as:

FIG. 1, a side view of a boring bar constructed in accordance with the invention.

FIG. 2, a view taken on line 2—2 of FIG. 1.

FIG. 3, a view on line 3—3 of FIG. 1.

FIG. 4, an elevation of the adjustment mechanism removed from the boring bar.

FIG. 5, a side view of the adjustment mechanism taken at 90° to the view of FIG. 4.

FIG. 6, an end view of the assembly.

FIG. 7, a sectional view on line 7—7 of FIG. 1.

FIG. 8, a view of a modified construction utilizing the same principles as those shown in FIG. 1.

DETAILED DESCRIPTION OF THE INVENTION

The Tool Carrying Slide Blocks

With reference to the drawings, in FIGS 1, 2 and 3 is depicted a boring bar body 20 having a mounting shaft 22. It will be appreciated that relative rotation is required between the workpiece and the boring bar, but this can be achieved by rotation of the boring bar or the work. The face (working end) of the boring bar is provided with a diametrical slot 24 with parallel sides to receive two tool slide blocks 30 and 32 which rest in the slot between the sides in close sliding relation. Each groove block has at an outer working end, a pocket to receive an insert anvil 34 and a cutting insert 36 formed of a proper grade of tungsten carbide or other cutting material selected for the job to be done. The inserts and the anvils are secured by any of the conventional mechanisms such as eccentric screws or clamps. The insert pockets are disposed at a proper angle to provide the necessary rake and clearance angles.

As shown in FIGS 3, 6 and 7, each groove block has elongate slots, 38 and 40 respectively, on the side facing the slot walls. As illustrated in FIGS 6 and 7, a dowel 42 has a light press fit in a drilled hole which opens to the wall adjacent slot 38 to engage the edge of the slot and serve as a retainer for the block. A dowel 44 is positioned parallel to block 32 in a recess 46 in a location to engage slot 40. A set screw 48 with an Allen wrench socket is positioned in a threaded hole perpendicular to dowel 44 to move the dowel 44 tight against the block, thus camming the block 32 tightly into the boring head slot 24 and against the adjacent tool block 30. Thus, in any adjusted position, the tool blocks can be tightly secured in the boring bar body.

In FIGS 6 and 7, it can be seen that the surfaces of the blocks 30 and 32, which are in face-to-face relation to the bottom of slot 24 in the boring bar body, are provided with parallel slots disposed at 45° to the longitudinal axis of the blocks. Block 30 has slots 50 and 52 and block 32 has slots 60 and 62.

The Adjustment Mechanism

The adjustment mechanism for the boring bar is illustrated in isolation in FIGS 4 and 5. This mechanism is in the form of a cylindrical cartridge which fits into a cylindrical bore 70 in the boring bar lying normal and adjacent to the tool block slot 24 such that the bore opens to the base of the slot. As shown in FIGS 3, 6 and 7, the bore 70 is open to the surface of the bar at one end but terminates short of the opposite wall at 72. A tapped hole 74, coaxial with the bore 70, opens to the outside of the bar body for purposes to be described.

Referring again to FIGS 4 and 5, a cartridge cylinder 80 has a flat side 82 and a central bore 84 which enters one end of the cartridge and terminates a short distance in. A tapped hole 88, on axis with cartridge 80, penetrates the other end wall. A relatively deep elongate slot 90 is milled into the cartridge flat wall 82 to open to the bore 84 and the tapped hole 88 at one end. A control screw has an enlarged head 92 bearing against the end of the cartridge with peripheral graduations and an Allen wrench socket (FIG. 1). Integral with this head is a short shank portion in bore 84 having an annular groove 93 to cooperate with a locator pin 94. The remainder of the screw shank is composed of two threaded portions 96 and 98 of different diameters and with differential threading of the same pitch. For example, the portion 96 can have #10–40 left hand thread, square to the head, and the smaller shank can have a #6–40 right end thread, also square to the head. These threaded portions of the screw extend into the milled slot 90.

Within the slot 90 are two actuator pin mounting slides 100 and 102, cylindrical in cross-section as viewed in FIG 4, having flat chordal sides facing each other. Each of these slides carries, respectively, pins 104 and 106, projecting upwardly from the cartridge surface 82 and dimensioned to fit in a sliding relationship in the angled slots 50 and 60 or 52 and 62 in the base of the tool block slides 30 and 32. These pin slides are threaded, respectively, on the screw shank portions 96 and 98 such that they move in opposite directions in slot 90 when screw head 92 is turned.

The cartridge is located axially in the bore 70 of the body 20 by a differential screw 110 which has one end threaded into the tapped hole 88 in the cartridge and the other end threaded into the tapped hole 74 at the end of bore 70.

Operation

When the parts, as above described, are assembled as shown in FIGS 3, 6 and 7, the pins 104 and 106 are riding in angled slots 50 and 60 in the bottom of the tool blocks 30 and 32. It will be seen that an axial shifting of the cartridge 80 will cause the tool blocks to shift endwise relative to the center of the boring bar. Thus, by rotation of the differential screw 110, the tool blocks can be adjusted endwise so that the cutting edges are exactly positioned relative to the center of the bar. A suitable lock plug or other device may be utilized to maintain screw 110 in an adjusted position.

Once the tool blocks are centered, they can be moved in and out by a rotation of the calibrated head 92. The actuation of the differential screw shanks 96 and 98 cause a simultaneous and equal lateral motion of the pin slides 100 and 102 and the pins 104 and 106, acting in the slots 50 and 60, will cause the blocks to be cammed in or out depending on the direction of rotation. When the adjusting is taking place, the set screw 48 will be loosened to take the pressure off the locking pin 44. When the adjustment to the desired diameter is reached, the set screw is tightened to lock the tool blocks in position. Slots 52 and 62 are provided in the tool blocks to provide a major increase in diameter if such is desired and to allow a predetermined range of adjustment at the larger diameter.

In FIG 8, a modified structure is illustrated. In the mechanism previously disclosed, the tool blocks carried 45° slots which were cammed by the pins. In FIG 8, the tool blocks 120 and 122 have base grooves 124 and 126 which are perpendicular to the longitudinal dimension of the blocks. However, the control cartridge 80 in this case is disposed at a 30° angle to the direction of movement of the blocks and pins 128 and 130 on the pin slides of the cartridge act in these transverse slots to create the camming action to shift the tool blocks in and out. In other respects, the construction is identical to that previously described except that the tool blocks are slotted to receive the shank of headed locking bolts 132 which can fix the adjusted position of the tool blocks.

What I claim is:

1. A boring bar comprising:
   (a) a body having a mounting end and a working end, said working end having a transverse slot for receiving slidable tool blocks, and having a cartridge recess axially spaced from but in communication with said slot and disposed at an angle to said slot,
   (b) a pair of elongate tool blocks slidable in said boring bar body slot in the direction of the longitudinal axis of said slot and having means to carry a cutting insert at one end, each of said blocks having a slot extending transversely of the longitudinal axis of the block,
   (c) a cartridge actuator in said cartridge recess comprising an elongate body having an elongate slot opening to said transverse slot in said body,
   (d) a pair of actuator pin slides in said cartridge slot having pins extending respectively into said transverse slots in said tool blocks, and
   (e) means movable to actuate said pin slides in equal and opposite directions to cause said tool blocks to move in equal and opposite directions in said transverse slot of said boring bar body.

2. A boring bar as defined in claim 1 in which means is provided to move said cartridge axially in said boring bar body to cause shifting of tool blocks to attain identical radial positioning.

3. A boring bar as defined in claim 1 in which a differential screw is threaded into said body at one end of said cartridge recess and into one end of said cartridge to cause shifting of tool blocks to attain identical radial positioning.

4. A boring bar as defined in claim 1 in which said means to actuate said pins comprises a differential screw mounted for rotation in one end of said cartridge and having opposite screw thread pitch portions threaded into said actuator pin slides to move said pins in equal opposite directions upon rotation of said differential screw.

5. A boring bar as defined in claim 1 in which said slots in said tool blocks are disposed at an acute angle to the longitudinal axes of said tool blocks, and said cartridge recess is on an axis normal to said transverse slot in said boring bar body.

6. A boring bar as defined in claim 1 in which said slots in said tool blocks are normal to the longitudinal axis of said blocks, and said cartridge recess is on an axis disposed at an acute angle to said transverse slot in said boring bar body.

7. A boring bar as defined in claim 1 in which said tool blocks are disposed in side-by-side sliding relationship on contiguous sides and have longitudinal surface grooves on the non-contiguous sides disposed in the direction of and parallel to the direction of movement of said blocks, dowel pin means disposed in recesses in the walls of said transverse slot to engage said surface grooves to lock said tool blocks in said transverse slot, and means to engage one of said dowel pins to exert pressure on said blocks to lock them on an adjusted position.

* * * * *